3,839,383
HYDROLYSIS-RESISTANT UNSATURATED ORGANIC COMPOUNDS CONTAINING HINDERED ALKOXY OR ARYLOXY GROUPS
Hans-Joachim Kotzsch, Rheinfelden, and Robert Buning, Oberlar, Germany, assignors to Dynamit Nobel Aktiengesellschaft, Troisdorf, Germany
No Drawing. Continuation-in-part of abandoned application Ser. No. 758,193, Sept. 5, 1968. This application Oct. 27, 1971, Ser. No. 193,145
Claims priority, application Germany, Sept. 8, 1967, D 54,066
Int. Cl. C07f 7/18
U.S. Cl. 260—448.8 R    25 Claims

ABSTRACT OF THE DISCLOSURE

Novel hydrolysis resistant, unsaturated silicon compounds having the formula:

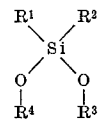

wherein $R^1$ is alkenyl, $R^2$ is alkenyl, tert.-alkoxy, alkoxy or halogen, and $R^3$ and $R^4$ each represent tert. alkyl which may be joined together.

The above compounds constitute per se finishing agents for siliceous materials such as glass fibers, glass fabrics, glass rovings, sand, etc. or water-repellant agents, parting agents, impregnants for surface treating minerals, textiles, wood, etc.

They can be prepared by reacting a silicon compound of the formula $R^1Si(R^2)_{0 \text{ to } 2}X_{1 \text{ to } 3}$ wherein $R^1$ and $R^2$ are as above defined, and X is halogen, preferably chlorine with a tert. alcohol moiety containing one or two tertiary hydroxyl groups.

---

This application is a continuation-in-part of application Ser. No. 758,193, filed September 5, 1968, now abandoned.

The invention relates to a novel class of hydrolysis-resistant, unsaturated silicon compounds and to a process of preparing the same.

German Pat. 1,210,849 describes the production of hydrolysis-resistant halogenated alkoxy or aryloxy alkenyl silanes. It has been found that these materials are not sufficiently hydrolysis-resistant for some applications and therefore it is a principal object of this invention to provide a novel series of alkoxy alkenyl silanes which are more resistant to hydrolysis than are the silanes of the above-referred-to German patent.

In accord with and fulfilling this object, therefore, one aspect of this invention resides in a novel series of alkoxy, alkenyl silanes of the formula:

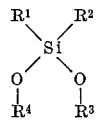

wherein $R^1$ is an alkenyl group; $R^3$ and $R^4$ are each tertiary alkyl, or $R^3$ and $R^4$ may be a single moiety, preferably an alkylene hydrocarbon having two terminal tertiary alkyl groups attached to the oxygen moieties respectively; and $R^2$ is alkenyl, tertiary alkoxy, halogen or normal alkoxy.

It is important to note that the tri-tertiary alkoxy alkenyl silanes are the preferred hydrolysis-resistant compounds of this invention. Also included within this invention of course are the ditertiary alkoxy dialkenyl silanes or ditertalkoxy-halo-alkenyl silanes.

Attempts have been made to produce the desired di- or tri-tertiary alkoxy alkenyl silanes defined above by the reaction procedure and process set forth in German Pat. No. 1,210,849. According to this process alcohols of the formula $R^3OH$ and $R^4OH$ are reacted with a halo silane of the formula $R^1R^2SiXY$, where X and Y are halogen, $R^1$ is an alkenyl, $R^2$ is alkyl, alkenyl, aryl or alkoxy, and $R^3$ and $R^4$ are halogenated alkyl or aryl groups. This reaction is carried out in the liquid phase either in the fused state or in a solvent system. This patent shows using a hydrogen chloride acceptor such as pyridine in the system.

While the reaction process described in this German patent and outlined above works well for the production of halogenated normal alkoxy and aryloxy alkenyl silanes, it has been found that if the desire is to produce di- or tert-alkoxy alkenyl silanes the procedure of German Pat. 1,210,849 is not capable of producing the desired product in satisfactory yields. In fact, it has been found that the production of tri-tertiary alkoxy silanes is substantially impossible by the procedure set forth in the above-referred-to German patent.

It is therefore another object of this invention to provide a novel, modified process of producing di- or tri-tertalkoxy alkenyl silanes.

In accord with and fulfilling this object of this invention, the products of this invention as defined above are produced by reacting:

(1) a silicon compound of the formula $$R^1Si(R^2)_{0 \text{ to } 2}X_{1 \text{ to } 3}$$

wherein $R^1$ and $R^2$ have the meanings set forth above and X is a halogen;

(2) an alcoholic moiety having the effective formula $R^3OH$, $R^4OH$ and/or $HOR^3$—$R^4$—$OH$ containing one or two terminal tertiary hydroxy groups in the liquid phase.

The alcohol reactant may be in the form of an alkali metal alcoholate or in the form of a free alcohol. In the latter case the reaction should be carried out in the presence of an amine, particularly a tertiary amine such as pyridine of N,N-dimethyl aniline. Where alcoholates are used, the metal may for example be sodium or potassium.

The tertiary alkyl portion of the tertiary alkoxy groups designated as $R^3$ and/or $R^4$ have about 4 to 10 carbon atoms therein. These tertiary alkyl groups are exemplified by tertiary butyl, tertiary pentyl, 2,2,5,5-tetramethyl hexylene and 2,2-dimethyl-n-octyl.

The alkenyl portion of the reactants and products of this invention is conventional in all aspects. It is generally preferred to utilize vinyl as the alkenyl but allyl, crotyl, propenyl and higher homologues are also suitable.

The halogens referred to herein are generally chlorine or bromine but iodine and even fluorine may in some cases be suitable.

It is indeed surprising that the condensation reaction described herein is operative with tertiary alcohols. It would have been expected that the esterification reaction with tertiary alcohols would be adversely affected or even completely prevented because of the peculiar structural features of steric hindrance and also because of the characteristic easy dehydratability of the aliphatic tertiary hydroxyl groups resulting in the formation of water and branched olefins. Further because of the ease of substitution by hydrogen halides into branched and straight chain olefins it would have been expected that any condensation which was initiated would generate hydrogen halide which would then add across coproduced olefinic unsaturation, particularly the more reactive terminal branched chain unsaturation which was likely to occur by dehydration of the tertiary alcohols.

This reaction was also unexpected because numerous reactions are known between organo halogen silane compounds and organo-functional groups, in which the organofunctional group always reacts, resulting in the development of organopolysilanes in which the silicon halogen bond of the monomeric starting products is preserved.

In the process according to the invention, surprisingly, none of the aforesaid reaction possibilities occurred, such as were to have been expected according to the state of the art. It is to be considered especially surprising that the alkaline compounds functioning as condensing agents have no polymerizing effect, and that the reaction results in the formation of the new unsaturated silicon compounds according to the invention. Furthermore, it has been surprisingly found that the unsaturated reactants used according to the invention react more easily and quickly in the process of the invention than do the corresponding saturated compounds.

It has furthermore been observed, in accordance with the invention, that the compounds wherein $R^1$, $R^3$ and $R^4$ have the same significance as given above and $R^2$ represents halogen can be converted with alkali lyes into *disiloxanes* of the formula:

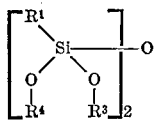

without the hydrolysis of the tertiary alkoxy groups taking place.

The reaction should be conducted in the substantial absence of water. Therefore, amines are used preferably as hydrogen chloride acceptors. In connection with these amines, however, a distinction must be made between those which act chiefly as hydrogen halide acceptors and those which act catalytically to additionally accelerate the esterification of the sterically hindered alcoholate containing reactants hereof. All of the catalytically acting amines, such as N,N-dimethylaniline, for example, contain nitrogen atoms that are not a component of an aromatic ring system. The distinction in the nature of the amines can be classified with reference to an example of the reaction wherein vinyl trichlorsilane and tertiary butanol are esterified to form vinyl tri-tert.-butoxy-silane. Whereas yields of triester of 30–40% are obtained using pyridine as an acid acceptor, and a large proportion of vinyl di-tert.-butoxychlorosilane develops as a by-product, the yield of triester is significantly increased to about 60–70% in a short time if N,N-dimethylaniline is added to the system. This improvement has been found even when pyridine is used as the HCL acceptor in the presence of as little as approximately 1% of N,N-dimethylaniline. If tertiary alcohols are used without an hydrogen chloride acceptor, chloroalkanes and siloxanes develop as significant by products.

Starting reactants for use in the process of the invention are, for example: vinyltrichlorosilane, propenyltrichlorosilane, allyltrichlorosilane, vinyltert.-butoxydichlorosilane, vinyldi - tert. - butoxychlorosilane, vinyldi-tert.-pentoxychlorosilane, 2 - vinyl-2-chloro-2-sila-4,4,5-tetramethyldisiloxane, allyldi-tert.-butoxychlorosilane and propenyldi-tert.-butoxychlorosilane.

Examples of suitable alcoholates are those based on the tertiary alcohols, particularly those which have 4 to 10 carbon atoms, such as tert.-butanol, tert.-pentanol and pinacol.

It is desirable to carry out the reaction in the liquid phase either in the melt or in the presence of an inert solvent. As inert solvents, any ether or hydrocarbon, such as dioxane, diphenyl ether, benzene and hexane, can be used. The inert solvent is preferably one in which the halide salt formed during the reaction is insoluble.

The reaction is generally carried out by first dissolving the starting materials separately in a suitable solvent, combining these solutions with agitation, and heating the resulting mixture to elevated temperature, with the application of pressure, if desired. After filtering out the salt that may have formed by reaction of the acceptor and the hydrogen halide acid, and after removal of the solvent that may have been used by distillation, the compounds are purified by the customary distillation methods.

The compounds according to the invention are characterized by good hydrolysis resistance. They can be homopolymerized. They can be used as finishes for siliceous materials such as silicon dioxides, glass fibers, glass fabrics, glass roving, sand, etc., as water-repellants, parting agents and impregnating agents for the surface treatment of minerals, textiles, wood, etc. The products of this invention are especially valuable as sizes for glass fibers, as comparative experiments have shown.

Representative novel products made according to this invention are:

vinyl-tri-tertiary-butoxysilane
vinyl-tri-tertiary-pentoxysilane
allyl-tri-tertiary-butoxysilane
propenyl-tri-tertiary-butoxysilane
vinyl-di-tertiary-pentoxychlochlorosilane
2-vinyl-2-chloro-4.4.5.5-tetramethyl-2-siladioxolane,
allyl-di-tert.-butoxychlorosilane,
propenyl-di-tert.-butoxychlorosilane,
vinyl-di-tert.-butoxymethoxysilane,
vinyl-di-tert.-butoxyethoxysilane,
bis-vinyl (allyl/propenyl)tetrakis-tert.-butoxydisiloxane,
2,2''-divinyl-bis-(4.4.5.5-tetramethyl-2-siladioxolanyl)-2.2'-ether,
vinylmethyl-di-tert.-pentoxysilane,
2-vinyl-2-methyl-4.4.5.5-tetramethyl-2-siladioxolane.

The following examples are given in order to illustrate the invention but do not constitute a limitation on the scope thereof.

EXAMPLE 1

In an agitator with dropping funnel, internal thermometer and reflux condenser, 0.9 mole of potassium-tert.-butylate were suspended in 1200 ml. of dry benzene. Under ice-cooling, within one hour the solution of 0.3 mole of vinyltrichlorosilane is added drop by drop to 200 ml. dry benzene. Afterwards, the mixture is heated for one hour under refluxing conditions. Finally, $CO_2$ is introduced via a gas inlet tube into the boiling solution over a period of 20 minutes. Vinyl-tri-tert. butoxysilane (boiling point$_{20}$=94–95° C., $n_D^{20}$=1.4076) in an 88% yield is obtained when worked-up by two washings with water and column distillation of the organic phase.

Analysis for $C_{14}H_{30}O_3Si$—Calculated (percent): C, 61.35; H, 10.92; Si, 10.30. Found (percent): C, 61.44; H, 11.03; Si, 10.22.

EXAMPLE 2

A solution of 1 mole of vinyltrichlorosilane and 500 ml. of dry benzene is poured into a 2-liter round flask equipped with agitator, reflux condenser, internal thermometer and dropping funnel. A mixture of 2 moles of tert.-butanol, 2 moles of pyridine and 300 ml. of benzene are added drop by drop to the solution, with ice-cooling and agitation. Thereafter, it is heated for one hour under refluxing conditions. After cooling the precipitated pyridine hydrochloride is sucked off and the filtrate is distilled via a 700 mm. high packed column. Vinyl-di-tert.-butoxychlorosilane (boiling point$_{20}$=82–83° C., $n_D^{20}$=1.4175) in an 86% yield is obtained.

Analogous to Example 1, from 0.9 moles of this compound vinyl-tri-tert.-butoxysilane having a yield of 94% are obtained.

EXAMPLE 3 (COMPARISON TEST)

Carried out analogous to Example 2, however a mixture of, 3 moles each of tert.-butanol and vinyl trichlorosilane, and pyridine are added drop by drop; thus is formed vinyl-di-tert.-butoxychlorosilane in a 70% yield, while each of about 0.5 moles of tert.-butanol and pyridine are recovered. Vinyl-tri-tert.-butoxysilane is formed in a yield of about 30%.

EXAMPLE 4

0.2 moles of vinyl-di-tert.-butoxychlorosilane were heated in a 50% benzene solution having excess 1 normal caustic soda under refluxing conditions over a period of two hours. Distillation of the organic phase resulted in a quantitative yield of bis - vinyl - tetrakis - tert.-butoxydisiloxane (boiling point$_{20}$=150–152° C.); $n_D^{20}$=1.4200).

EXAMPLE 5

Analogous to Example 1, 96% of vinyl-di-tert.-butoxymethoxysilane (BP$_{20}$=80–81° C., $n_D^{20}$=1.4095) were synthesized from 0.9 moles of vinyl-di-tert.-butoxychlorosilane with 0.9 moles of sodium methylate.

EXAMPLE 6

Analogous to Example 1, 93% of vinyl-di-tert.-butoxyethoxysilane (BP$_{20}$=89–90° C., $n_D^{20}$=1.4090) were synthesized from 0.9 moles of vinyl-di-tert.-butoxychlorosilane with 0.9 moles of sodium-ethylate.

EXAMPLE 7

Analogous to Example 1, 0.45 moles of vinylmethyl-dichlorosilane were reacted with 0.9 moles of sodium-tert.-butylate. In quantitative yield, vinylmethyl-di-tert.-butoxysilane (BP$_{40}$=83° C., $n_D^{20}$=1.4108) was obtained.

EXAMPLE 8

Analogous to Example 2, 1 mole of vinyltrichlorosilane was reacted with 1 mole of pinacoe in the presence of 2 moles of N,N-dimehtyl-aniline. 2 vinyl-2-chloro-4.4.5.5 - tetramethyl - 2 - siladioxolane (BP$_{35}$=85° C., $n_D^{20}$=1.4427) were obtained in a 76% yield.

Analysis for C$_8$H$_{15}$ClO$_2$Si—Calculated (percent): C, 7.39; H, 13.66; Si, 17.08. Found (percent): C, 7.06; H, 13.80; Si, 16.94.

When agitating the benzene solution with 1N-caustic soda, the compound forms a disiloxane having the following structure:

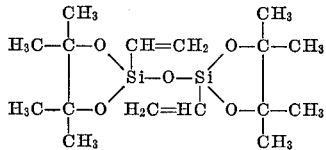

2.2' - divinyl-bis-(4.4.5.5-tetramethyl-2-siladioxolanyl)-2.2'-ether (BP$_{10}$=158° C., $n_D^{20}$=1.4522). A hydrolysis of the dioxolane ring does not take place.

EXAMPLES 9–14

Analogous to Example 2, the following substances were produced:

EXAMPLE 15

The compound described in Example 10 forms divinyl-tetra-tert. pentoxydisiloxane (BP$_5$=162–165° C., $n_D^{20}$=1.4390)

when agitated in benzene solution with 1 N-caustic potash solution, in a quantitative yield without hydrolysis of the tert.-pentoxy groups.

EXAMPLE 16

Analogous to Example 1, 0.2 moles of the compound described in Example 13 are reacted with 0.2 moles of potassium-tert.-butylate. Allyl-tri-tert.butoxysilane (BP$_{12}$=90–92° C.)

were obtained in an 89% yield.

EXAMPLE 17

Analogous to Example 16, in an 92% yield propenyl-tri-tert-butoxy-silane (BP$_{10}$=94° C.) was synthesized from the substance described in Example 14.

We claim:
1. A hydrolysis resistant unsaturated organic silicon compound having the formula:

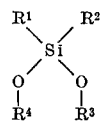

wherein R$^1$ is alkenyl having 2–4 carbon atoms, R$^2$ is a member selected from the group consisting of alkenyl having 2–4 carbon atoms alkoxy up to 10 carbon atoms and halogen, R$^3$ and R$^4$ are each sterically hindered tertiary alkyl or taken together are di-tert.-alkyl having 4–10 carbon atoms.

2. A hydrolysis resistant unsaturated organic silicon compound according to claim 1 designated vinyl-tri-tert.-butoxysilane.

3. A hydrolysis resistant unsaturated organic silicon compound according to claim 1 designated vinyl-tri-tert.-pentoxysilane.

4. A hydrolysis resistant unsaturated organic silicon compound according to claim 1 designated allyl tri-tert.-butoxysilane.

5. A hydrolysis resistant unsaturated organic silicon compound according to claim 1 designated propenyl tri-tert.-butoxysilane.

6. A hydrolysis resistant unsaturated organic silicon compound according to claim 1 designated propenyl-di-tert.-butoxychlorosilane.

7. A hydrolysis resistant unsaturated organic silicon compound according to claim 1 designated vinyl-di-tert.-butoxymethoxysilane.

8. A hydrolysis resistant unsaturated organic silicon compound according to claim 1 designated vinyl-di-tert.-butoxyethoxysilane.

| Ex. No. | Substance | Yield, percent | B.P., °C. (mm. Hg) | $n_D^{20}$ | Starting substances | | |
|---|---|---|---|---|---|---|---|
| | | | | | Silane | Alcohol | Amine |
| 10 | Vinyl-di-tertiar-pentoxychlorosilane | 71 | 95–97(10) | 1.4321 | Vinyl trichloro silane. | Tertiar-pentanol | Triethylamine. |
| 11 | Vinylmethyl-ditertiar-pentoxysilane | 88 | 102–104(20) | 1.4251 | Vinylmethyl di-chlorosilane. | ----do---- | Pyridin-. |
| 12 | 2-vinyl-2-methyl-4.4.5.5-tetramethyl-2-siladioxolane. | 80 | 72(30) | 1.4389 | ----do---- | Pinacon (1 mol) | Pyridine. |
| 13 | Allyl-di-tertiar-butoxychlorsilan | 90 | 85–86(18) | 1.4238 | Allyltrichlorsilan | Tertiar-butanol | Do. |
| 14 | Propenyl-di-tertiar-butoxychlorsilan | 91 | 94–95(17) | 1.4261 | Propenyltrichlor-silane. | ----do---- | Do. |

9. A compound having the formula:

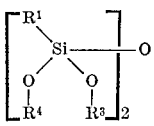

wherein R¹ is alkenyl having 2–4 carbon atoms, and R³ and R⁴ are the same or different tertiary alkyl or taken together are di-tert.-alkyl having 4–10 carbon atoms.

10. A compound according to claim 9 having the formula:

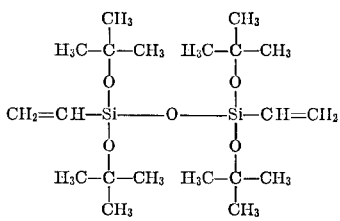

11. A compound according to claim 9 having the formula:

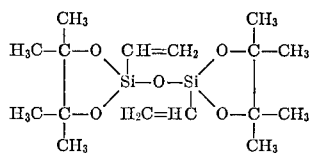

12. A hydrolysis resistant unsaturated organic silicon compound according to claim 1 designated 2 - vinyl-2-chloro-4,4,5,5-tetramethyl-2-siladioxolane.

13. A hydrolysis resistant unsaturated organic silicon compound according to claim 9 designated bis-vinyl-tetrakis, tert-butoxy-disiloxane.

14. A hydrolysis resistant unsaturated organic silicon compound according to claim 9 designated bisallyl-tetrakis, tert-butoxydisiloxane.

15. A hydrolysis resistant unsaturated organic silicon compound according to claim 9 designated bispropenyl-tetrakis, tert-butoxydisiloxane.

16. 2,2′-divinyl-bis-(4.4.5.5 - tetramethyl - 2 - siladioxolanyl)-2.2′-ether.

17. Vinylmethyl-di-tert.-pentoxysilane.

18. 2-vinyl-2-methyl - 4.4.5.5 - tetramethyl-2-siladioxolane.

19. Process of preparing a compound according to claim 1 which comprises reacting a silicon compound having the formula $R^1Si(R^2)_{0\ to\ 2}X_{1\ to\ 3}$ wherein R¹ and R² are as defined in claim 1 and X is a halogen which comprises contacting the same with a compound of 4 to 10 carbon atoms having an alcoholate moiety, said compound selected from the group consisting of tertiary alcohols, ditertiary alcohols and alkali metal alcoholates in the presence of catalytical amounts of a tertiary amine hydrogen chloride acceptor.

20. Process as claimed in claim 19 wherein said alcohol moiety is an alkali metal alcoholate.

21. Process as claimed in claim 19 wherein said alcohol moiety is a free alcohol and including carrying out said reaction in contact with a stoichiometric of a tertiary amine acid acceptor.

22. Process according to claim 21 wherein said tertiary amine is selected from the group consisting of triethylamine, tributylamine, α-picoline and N,N-dimethylaniline.

23. Process as claimed in claim 19 wherein X is chlorine.

24. Process according to claim 19 including effecting said reaction in the presence of an inert solvent.

25. Process of preparing a compound of the formula:

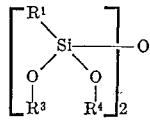

which comprises reacting a compound as claimed in claim 1, when R₂ is halogen with an alkali lye.

References Cited
UNITED STATES PATENTS

| | | | |
|---|---|---|---|
| 2,777,869 | 1/1957 | Bailey et al. | 260—448.8 R |
| 2,566,957 | 9/1951 | Pedlow et al. | 260—448.8 R |
| 2,947,772 | 8/1960 | Eynon et al. | 260—448.8 R |
| 3,256,308 | 6/1966 | Sterling et al. | 260—448.8 R |
| 3,433,819 | 3/1969 | Braun | 260—448.8 R |
| 2,851,474 | 9/1958 | Pines et al. | 260—448.8 R |
| 3,453,307 | 7/1969 | Nitzsche et al. | 260—448.8 R |
| 2,995,590 | 8/1961 | Peeler et al. | 260—448.8 R |

DANIEL E. WYMAN, Primary Examiner

P. F. SHAVER, Assistant Examiner

U.S. Cl. X.R.

117—124 F, 126 GQ, 135.1, 138.5; 106—12